L. HAYNE.
DEVICE FOR SHARPENING LAWN MOWER KNIVES.
APPLICATION FILED MAR. 31, 1910.
997,291.                                                Patented July 11, 1911.
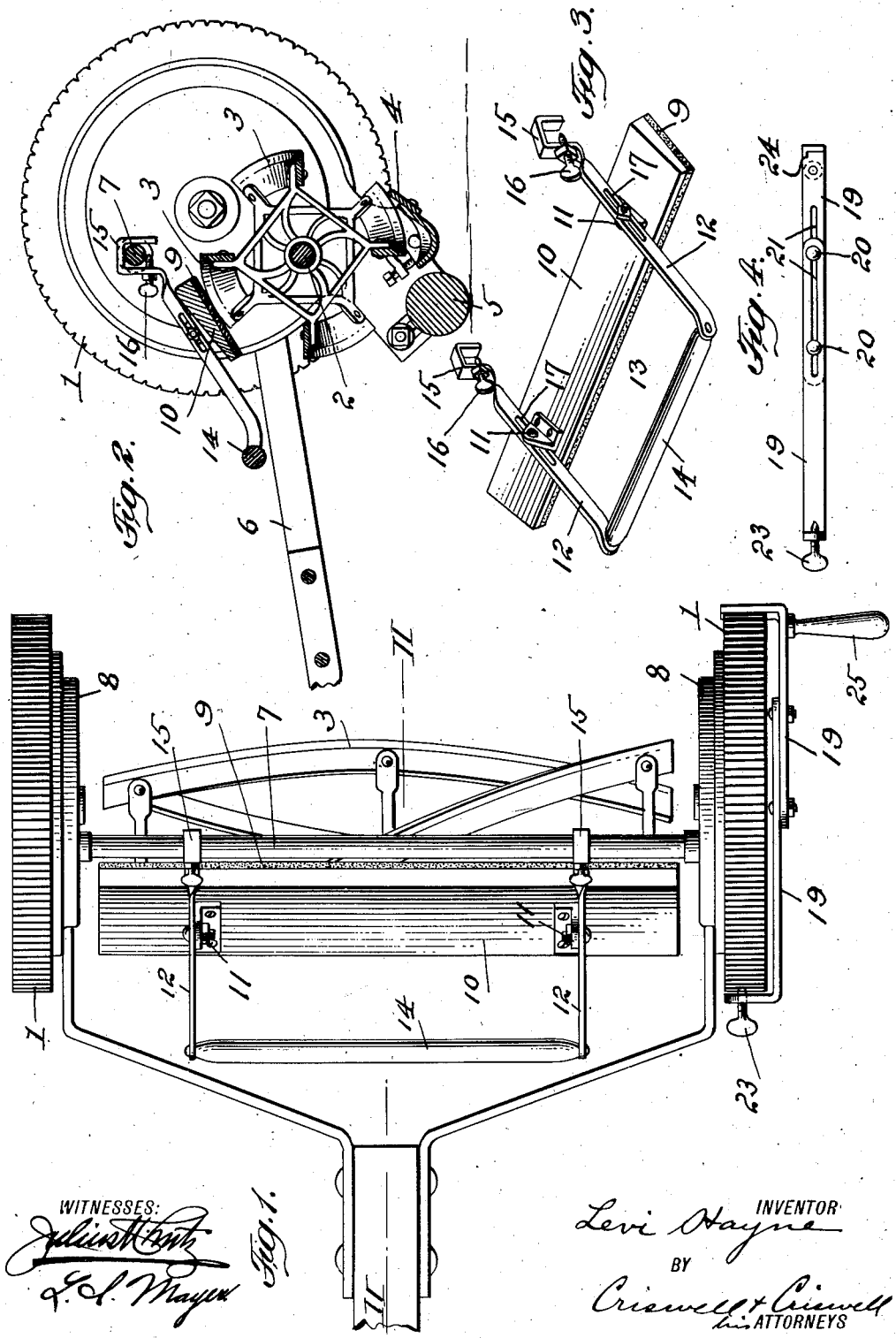
WITNESSES:
INVENTOR
Levi Hayne
BY
Criswell & Criswell
ATTORNEYS

UNITED STATES PATENT OFFICE.

LEVI HAYNE, OF SCHENECTADY, NEW YORK, ASSIGNOR TO PIKE MANUFACTURING COMPANY, OF PIKE, NEW HAMPSHIRE, A CORPORATION OF NEW HAMPSHIRE.

DEVICE FOR SHARPENING LAWN-MOWER KNIVES.

997,291.  Specification of Letters Patent.  Patented July 11, 1911.

Application filed March 31, 1910. Serial No. 552,644.

*To all whom it may concern:*

Be it known that I, LEVI HAYNE, a citizen of the United States, and a resident of the city of Schenectady, county of Schenectady, and State of New York, have invented certain new and useful Improvements in Devices for Sharpening Lawn-Mower Knives, of which the following is a specification.

It is the main object of this invention to provide a simple device which may be readily attached to a lawn mower, and by means of which the knives of the mower may be ground and sharpened, whereby the knives need not be detached from the mowing machine for the purpose of sharpening.

Another object of the invention is to provide a device, carrying abrasive material, which may be readily attached to and detached from one of the cross bars or reach bars of the mower frame in such a position that the abrasive material may be brought into engagement with the cutting edges of the mower knives.

A further object of the invention is to provide a detachable crank adapted to be connected to one of the transporting wheels of the mower so that by elevating the transporting wheels, said wheels and the mower knives may be rotated.

In the drawings, Figure 1 is a plan view of a lawn mower with my invention applied thereto; Fig. 2 a vertical sectional view on the line II—II of Fig. 1, the transporting wheels being elevated, and the mower handle being depressed, the mower being supported on the usual gage roller at the back of the cutter bar; Fig. 3 a detail perspective view of the grinding attachment; and Fig. 4 a side elevation of the clamp for attaching the crank handle to one of the mower wheels.

Referring to the various parts by numerals, 1 designates the transporting wheels of the mower, 2 the cutter shaft, 3 the mower knives carried thereby, 4 the stationary cutter bar, 5 the gage roller, 6 the handle of the mower, and 7 a reach bar running parallel with the mower shaft and extending between the gear cases 8 of the two mower wheels. These parts may be of any suitable construction, and as they form no part of my invention I will not further describe them.

In Fig. 2 the mower wheels are shown as elevated above the ground, the mower being supported by the gage roller 5, and the handle 6 being turned down so that its outer end rests upon the ground or floor, or other suitable support. With the mower in this position the wheels and the cutter shaft may be readily rotated.

To support an abrasive block 9 in parallel relation with the cutting edges of the mower knives I provide a bar 10 which extends parallel with the cutter shaft and is of equal length or slightly longer than the knives. The block 10 is provided with lugs 11 by means of which it may be secured to the substantially parallel spaced side bars 12 of a yoke 13, the outer ends of the side bars being connected together by means of a cross bar 14 which serves as a handle. The free ends of the side bars 12 of the yoke are bent to form the reach engaging hooks 15, said hooks being provided with clamping screws 16 by means of which the hooks may be locked in pivotal engagement with the reach bar. The said bars of the yoke are slotted, as at 17, to permit of the adjustment therealong of the block 10 carrying the abrasive material, in order that the said material may be brought into proper position for engagement with the edges of the mower knives.

From the foregoing it will be seen that when the mowing machine is arranged as shown in Fig. 2 the yoke carrying the abrasive block may be readily connected to the reach bar 7, and the abrasive material brought to bear on the edges of the mower knives; and that by pressing downwardly on the handle 14 of the yoke any desired pressure may be exerted on the mower knives through the abrasive material so that the knives will be properly ground.

In order to provide a ready means for rotating the cutter shaft I provide a clamp 18 formed of two longitudinally adjustable sections 19 which are connected together by bolts 20, said bolts passing through longitudinal slots 21 of the said sections. One of the sections 19 is bent outwardly to overlie the mower wheel, and is provided with a clamping screw 23 which is adapted to be screwed inwardly into engagement with the periphery of the wheel. The opposite end of the other bar 19 is bent outwardly to overlie the mower wheel at a point directly opposite the clamping screw 23, and the said bent end is formed with a rib 24 adapted to fit within one of the usual corrugations on the periphery of the mower wheel. One of the sections 19 is provided with a crank handle 25 by means of which the mower wheels, and therefore, the cutter shaft, may be readily rotated. It is, of course, to be understood that the mower shaft is connected by the usual gearing, not shown, with the mower wheels, so that as said wheels rotate the cutter shaft rotates.

From the foregoing it is manifest that I provide a very simple device which may be readily attached to a lawn mower frame, and by means of which the knives may be quickly and accurately sharpened. It will, of course, be understood that the abrasive material may be in any suitable form, and of course, the entire block 10 of abrasive material if such construction be found desirable. It is also to be understood that by means of the lugs 11, the block 10 of abrasive material may be adjusted to any desired angle to properly grind the cutting edges of the knives.

Having thus fully described my invention, what I claim as new and desire to secure by Letters Patent is:

1. A device of the character described, comprising spaced bars having engaging means at adjacent ends and having substantially alined slots intermediate their lengths, a bar connecting said spaced bars at their opposite ends, an abrading member, lugs extended from said abrading member, and means passing through the slots of the spaced bars and engaging the lugs of the abrading member for holding the abrading member to the spaced bars.

2. A device for sharpening the knives of a lawn mower, comprising two parallel side bars each having at one end a hook-shaped portion provided with a screw member for engagement of the bars with the reach rod of the mower, the said bars being connected at their other ends by a handle rod whereby they are spaced apart to engage the reach rod at its end portions, an abrading member secured at its end portions respectively to the intermediate parts of said bars to be shifted to and from the mower knives by swinging the device on the reach rod, and to be controlled by said handle.

This specification signed and witnessed this 30th day of March A. D. 1910.

LEVI HAYNE.

Witnesses:
  W. A. TOWNER, Jr.,
  L. I. MAYER.